United States Patent
Kang et al.

(10) Patent No.: US 9,887,423 B2
(45) Date of Patent: Feb. 6, 2018

(54) BINDER HAVING SUPERIOR ADHESIVE STRENGTH FOR SECONDARY BATTERIES

(71) Applicant: LG Chem, Ltd., Seoul (KR)

(72) Inventors: Min Ah Kang, Daejeon (KR); Young Min Kim, Daejeon (KR); Eun Joo Park, Daejeon (KR)

(73) Assignee: LG Chem, Ltd., Seoul (KR)

(*) Notice: Subject to any disclaimer, the term of this patent is extended or adjusted under 35 U.S.C. 154(b) by 0 days.

(21) Appl. No.: 14/433,281

(22) PCT Filed: Nov. 14, 2013

(86) PCT No.: PCT/KR2013/010344
§ 371 (c)(1),
(2) Date: Apr. 2, 2015

(87) PCT Pub. No.: WO2014/084527
PCT Pub. Date: Jun. 5, 2014

(65) Prior Publication Data
US 2015/0263350 A1    Sep. 17, 2015

(30) Foreign Application Priority Data

Nov. 29, 2012 (KR) .................. 10-2012-0136650

(51) Int. Cl.
| H01M 4/62 | (2006.01) |
| H01M 10/0525 | (2010.01) |
| C09D 133/08 | (2006.01) |
| C09D 133/10 | (2006.01) |
| C08F 220/18 | (2006.01) |
| H01M 10/052 | (2010.01) |
| H01M 4/131 | (2010.01) |
| H01M 4/133 | (2010.01) |

(52) U.S. Cl.
CPC .......... *H01M 4/622* (2013.01); *C08F 220/18* (2013.01); *C09D 133/08* (2013.01); *C09D 133/10* (2013.01); *H01M 10/0525* (2013.01); *H01M 4/131* (2013.01); *H01M 4/133* (2013.01); *H01M 10/052* (2013.01)

(58) Field of Classification Search
CPC .................................................. H01M 4/62
See application file for complete search history.

(56) References Cited

U.S. PATENT DOCUMENTS

| 2011/0183261 A1* | 7/2011 | Li | C23F 11/10 430/270.1 |
| 2012/0095131 A1* | 4/2012 | Kinoshita | H01M 4/621 523/410 |
| 2012/0152459 A1 | 6/2012 | Avramidis | |
| 2012/0183848 A1* | 7/2012 | Kang | H01M 4/622 429/211 |
| 2012/0264878 A1* | 10/2012 | Matsuyama | C08F 265/00 524/850 |
| 2012/0309892 A1* | 12/2012 | Ootsuka | H01M 4/13 524/546 |

FOREIGN PATENT DOCUMENTS

| CN | 102439769 A | 5/2012 | |
| EP | 2597709 A2 | 5/2013 | |
| KR | 1020060112822 A | 11/2006 | |
| KR | 10-2011-0098111 A | 2/2010 | |
| KR | 20110098111 A * | 9/2011 | ............ H01M 4/622 |
| KR | 10-2012-0010136 A | 2/2012 | |
| KR | 1020120010136 A | 2/2012 | |
| KR | 1020120039473 A | 4/2012 | |
| WO | 2012005496 A2 | 1/2012 | |
| WO | 2012011696 A2 | 1/2012 | |

OTHER PUBLICATIONS

Horiba Scientific, "Choosing Laser Diffraction or Dynamic Light Scattering (DLS)—Horiba," Aug. 2016, 5 pages [XP055298061].
Sun, Y., "Different Particle Size Information Obtained From Static and Dynamic Laser Light Scattering, A Thesis Submitted in Partial Fulfillment of The Requirements for The Degree of Master of Science," Univ. of Science and Technology of China, China, 1996, 94 pages [XP055298054].
Paul A Webb, "Interpretation of Particle Size Reported by Different Analytical Techniques", XP055239048, URL: http://www.micromeritics.com/pdf/mas/interpretation%20of%20particle%20size%20by%20different%20techniques.pdf (retreived on Jan. 6, 2016), Feb. 3, 2009, p. 6, lines 29-32.

* cited by examiner

*Primary Examiner* — Barbara L Gilliam
*Assistant Examiner* — Nathanael T Zemui
(74) *Attorney, Agent, or Firm* — Dentons US LLP

(57) ABSTRACT

Disclosed is a binder for secondary battery electrodes, the binder including polymer particles being prepared from monomers comprising (A) (meth)acrylic acid ester based monomers; (B) at least one monomer selected from the group consisting of an acrylate based compound, a styrene based compound, and a compound having a cyano group; (C) unsaturated monocarbonic acid based monomers; (D) (meth)acrylamide based monomers; and (E) monomers including at least one epoxy group for crosslinking, the polymer particles having an average particle diameter of 0.3 micrometers to 0.7 micrometers.

13 Claims, No Drawings

BINDER HAVING SUPERIOR ADHESIVE STRENGTH FOR SECONDARY BATTERIES

This application is a National Stage Entry of International Application No. PCT/KR2013/010344, filed Nov. 14, 2013, and claims the benefit of Korean Application No. 10-2012-0136650 filed on Nov. 29, 2012, all of which are hereby incorporated by reference in their entirety for all purposes as if fully set forth herein.

TECHNICAL FIELD

The present invention relates to a binder having superior adhesive strength for secondary batteries.

BACKGROUND ART

In line with rapid increase in use of fossil fuels, demand for alternative energy or clean energy is increasing. Thus, the field of power generation and electricity storage that use electrochemical reaction is most actively studied.

As a representative example of electrochemical devices using electrochemical energy, secondary batteries are currently used and use thereof is gradually expanding.

Recently, as technology for portable devices, such as portable computers, portable phones, cameras, and the like, continues to develop and demand therefor continues to increase, demand for secondary batteries as energy sources is rapidly increasing. Among these secondary batteries, research on lithium secondary batteries having high energy density, high operating potential, long cycle lifespan and low self-discharge rate has been underway and such lithium secondary batteries are commercially available and widely used.

In addition, as interest in environmental problems is increasing, research into electric vehicles, hybrid electric vehicles, and the like that can replace vehicles using fossil fuels, such as gasoline vehicles, diesel vehicles, and the like, which are one of the main causes of air pollution, is underway. As a power source of electric vehicles, hybrid electric vehicles, and the like, nickel-metal hydride secondary batteries are mainly used. However, research into lithium secondary batteries having high energy density and high discharge voltage is actively carried out and some of the lithium secondary batteries are commercially available.

Existing typical lithium secondary batteries use graphite as a negative electrode active material, and are charged and discharged while repeating the process that the lithium ions of a positive electrode are insert into and released from a negative electrode. Theoretical capacities of batteries depend on electrode active material types but charge and discharge capacity is mostly reduced as cycle life progresses.

A main cause of such a phenomenon is insufficient function of an active material, due to separation between electrode active materials or between an electrode active material and a collector due to volume change of an electrode, occurred according to repetitive charge and discharge of a battery. In addition, during insertion and release processes, lithium ions inserted into a negative electrode are not normally released therefrom and, thus, active sites of the negative electrode reduces, thereby deteriorating charge/discharge capacity and battery lifespan.

In particular, when, in order to increase discharge capacity, natural graphite having a theoretical discharge capacity of 372 mAh/g is used with a material such as silicon, tin, silicon-tin alloy, or the like having a large discharge capacity, volume of a material dramatically expands according to progression of charge and discharge and, as such, a negative electrode material is separated from an electrode material. As a result, repetitive cycles are progressed and, thus, capacity of a battery is dramatically reduced.

Thus, there is an urgent need in the art to study a binder and an electrode material that may have strong adhesive strength so as to prevent separation between electrode active material components or separation between an electrode active material and a current collector and may achieve structural stability of an electrode by controlling volume expansion of an electrode active material caused as charging and discharging are repeated and, accordingly, enhance battery performance.

A conventional solvent-based binder, i.e., polyvinylidene fluoride (PVdF), does not satisfy meet such requirements and thus, recently, a method of using binders prepared by preparing emulsion particles by aqueous polymerization of styrene-butadiene rubber (SBR) and mixing the emulsion particles with a neutralizing agent and the like has been proposed and is currently commercially available. These binders are eco-friendly and used in a small amount and thus may increase battery capacity.

Therefore, there is an urgent need to develop a binder that enhances cycle characteristics of a battery, imparts structural stability to an electrode, and has high adhesive strength.

DISCLOSURE

Technical Problem

The present invention aims to address the aforementioned problems of the related art and to achieve technical goals that have long been sought.

As a result of a variety of extensive and intensive studies and experiments, the inventors of the present invention developed, as described below, a binder for secondary battery electrodes, including polymer particles including essentially (meth)acrylamide based monomers and a monomer including at least one epoxy group for crosslinking, the binder including polymer particles having an average diameter of 0.3 micrometers to 0.7 micrometers, and confirmed that, when the binder is used, adhesive strength to an electrode collector and bearing strength of an active material are excellent even at high drying temperature, thereby improving cycle characteristics of a battery, thus completing the present invention.

Technical Solution

In accordance with one aspect of the present invention, provided is a binder for secondary battery electrodes, the binder including a polymer particles being prepared from monomers comprising (A) (meth)acrylic acid ester based monomers; (B) at least one monomer selected from the group consisting of compounds having an acrylate based compound, a styrene based compound, and a cyano group; (C) unsaturated monocarbonic acid based monomers; (D) (meth)acrylamide based monomers; and (E) monomers for crosslinking, including at least one epoxy group.
the binder comprising polymer particles being prepared from monomers comprising An average particle diameter of polymer particles prepared with the monomers is 0.3 micrometers to 0.7 micrometers.

The binder for secondary battery electrodes according to the present invention is characterized by including the polymer particles.

In a specific embodiment, the polymer particles may be composed of the monomers of (A) to (E). In this case, the monomer of (A) may be included in an amount of 15 to 96 wt %, the monomers of (B) may be included in an amount of 1 to 55 wt %, the monomers of (C) may be included in an amount of 1 to 20 wt %, and the monomers of (D) may be included in an amount of 1 to 5 wt %, and the monomers of (E) may be included in an amount of 1 to 5 wt %, with respect to the total weight of the binder.

More particularly, the monomers of (A) may be (meth)acrylic acid ester monomers having $C_1$-$C_{14}$ alkyl groups. The (meth)acrylic acid ester based monomers may, for example, be at least one monomer selected from the group consisting of, methylacrylate, ethylacrylate, propylacrylate, isopropylacrylate, n-butylacrylate, isobutylacrylate, n-amylacrylate, isoamylacrylate, n-ethylhexylacrylate, 2-ethylhexylacrylate, 2-hydroxyethylacrylate, methylmethacrylate, ethylmethacrylate, propylmethacrylate, isopropylmethacrylate, n-butylmethacrylate, isobutylmethacrylate, n-amylmethacrylate, isoamylmethacrylate, n-hexylmethacrylate, n-ethylhexyl methacrylate, 2-ethylhexyl methacrylate, hydroxyethyl methacrylate, and hydroxypropyl methacrylate.

The acrylate based compound composing the monomers of (B) may, for example, be at least one compound selected from the group consisting of methacryloxy ethyl ethylene urea, beta-carboxy ethylacrylate, aliphatic monoacrylate, dipropylene diacrylate, ditrimethylolpropane tetraacrylate, hydroxyethyl acrylate, dipentaerythritol hexaacrylate, pentaerythritol triacrylate, pentaerythritol tetraacrylate, lauryl acrylate, ceryl acrylate, stearyl acrylate, lauryl methacrylate, cetyl methacrylate, and stearyl methacrylate.

The acrylate based compound is different from the monomers of (E) in that the acrylate based compound does not include an epoxy group.

The styrene based compound composing of the monomers of (B) may be at least one compound selected from the group consisting of styrene, alpha-methylstyrene, beta-methylstyrene, p-t-butylstyrene, and divinylbenzene. In this regard, a compound including the cyano group may be alkenyl cyanide, acrylonitrile, methacrylonitrile, or allyl cyanide, but the present invention is not limited thereto.

The monomers of (C), namely, mono-unsaturated carboxylic acid based monomers, may be at least one monomer selected from the group consisting of maleic acid, fumaric acid, methacrylic acid, acrylic acid, glutaconic acid, itaconic acid, tetrahydrophthalic acid, crotonic acid, isocrotonic acid, and nadic acid.

The monomers of (D), namely, (meth)acrylamide based monomers, may be one or more selected from the group consisting of acrylamide, methacrylamide, N-methylacrylamide, N-methylmethacrylamide, N,N-dimethylacrylamide, N,N-dimethylmethacrylamide, N-ethylacrylamide, N-ethylmethacrylamide, N-n-propylacrylamide, N-n-propylmethacrylamide, N-isopropylacrylamide, N-isopropylmethacrylamide, N-n-butylacrylamide, N-methylol(meth)acrylamide, N-butoxymethyl(meth)acrylamide, N-[4-(3-(4-dodecyl-phenylcarbamoyl)-propyl)phenyl]acrylamide (NDPA), (N-[5-(4-dodecyl-phenylcarbamoyl)-phenyl]acrylamide (DPPA), N-[3-{(4-dodecyl-phenylcarbamoyl)-methylene-carbamoyl}propyl-4-phenyl]acrylamide (DMCPA), and N-[3-{(4-dodecyl-phenylcarbamoyl)-pentamethylene-carbamoyl}propyl-4-phenyl]acrylamide (DPMCPA).

The monomers for crosslinking may be (meth)acrylate including at least one epoxy and may be more particularly glycidyl methacrylate.

The binder of the present invention may further include, in addition to the monomers, a molecular weight control agent and/or a crosslinking agent as polymerization additives.

The molecular weight control agent may be any one publically known in the art. For example, the crosslinking agent may be ethylene glycol dimethacrylate, diethylene glycol dimethacrylate, triethylene glycol dimethacrylate, 1,3-butanediol dimethacrylate, 1,6-hexanediol dimethacrylate, neopentyl glycol dimethacrylate, trimethylolpropane trimethacrylate, trimethylol methane triacrylate, aryl methacrylate (AMA), triaryl isocyanurate (TAIC), triaryl amine (TAA), diaryl amine (DAA), poly(ethylene glycol) dimethacrylate, poly(propylene glycol) dimethacrylate, poly(butylene glycol) diacrylate, or the like.

The binder according to the present invention may be prepared through emulsion polymerization. Temperature and time of the polymerization may be properly controlled according to polymerization methods or initiator types for polymerization. The polymerization temperature may be approximately 50 t to 100 t and the polymerization time may be approximately 1 to 20 hours.

An emulsifying agent used in emulsion polymerization may, for example, be a fatty acid salt represented by oleic acid, stearic acid, lauric acid, sodium or potassium salts of mixed fatty acids, a general anionic emulsifying agent such as rosin acid and the like, or a nonionic emulsifying agent such as polyoxyethylene lauryl ether, polyoxyethylene glycol, polyoxyethylene nonylphenyl ether, or the like. In a non-limiting example of the present invention, as the emulsifying agent, polyoxyethylene glycol and alkyldiphenyloxide disulfonate having a $C_1$-$C_{20}$ alkyl group were used, but the present invention is not limited thereto.

To prepare an electrode for a secondary battery, a drying process is carried out after coating a slurry. In the regard, when a water-based binder is used, it is difficult to dry. In addition, since water is a major factor deteriorating battery stability, complete drying of a slurry is important. When a dying process is carried out at high temperature, process time may be shortened and dying may be rapidly completed, but a large amount of binder migrates to a coated surface. As a result, adhesive strength is dramatically reduced and, as such, it is difficult to easily elevate drying temperature.

On the other hand, since the binder according to the present invention includes polymer particles having larger diameters than an average particle diameter of general polymerization polymer particles, a relatively large amount of polymer particles exists near a collector after drying. Accordingly, adhesion to a collector may be improved. However, when the diameters are too large, battery performance such as conductivity may be deteriorated. Therefore, as defined above, the diameters are 0.3 micrometers to 0.7 micrometers, preferably 0.4 micrometers to 0.6 micrometers, more preferably 0.4 micrometers to 0.5 micrometers. Given that an average particle diameter of polymers used in general emulsion polymerization is 0.1 micrometers to 0.3 micrometers, polymer particle sizes of the binder according to the present invention are considerably large.

The average particle diameter of the polymer particles may, for example, be controlled through a variety of methods such as change of a emulsifying agent type or the amount of the emulsifying agent, performing two-step polymerization, or the like.

In the present invention, the binder desirably further includes at least one material selected from the group consisting of a viscosity control agent and a filler. The viscosity control agent and the filler will be described in more detail below.

In addition, the present invention provides an electrode mix for secondary batteries, the electrode mix including an electrode active material which may occlude and release the binder and lithium.

The binder may, for example, be included in an amount of 0.5 to 20 wt %, preferably 1 to 10 wt %, based on the weight of the electrode mix.

The electrode mix for secondary batteries preferably further includes a conductive material. The conductive material will be described in more detail below.

As a preferable example of the electrode active material, there is lithium transition metal oxide powder or carbon powder.

In addition, the present invention provides an electrode for secondary batteries, the electrode being composed of the electrode mix coated over a collector.

The electrode may be prepared by drying and pressing after coating the electrode mix over a collector. The electrode for secondary batteries may be a positive electrode or a negative electrode.

The positive electrode, for example, is prepared by drying after coating a mixture including a positive electrode active material, a conductive material, a binder, and the like over a positive electrode collector, and the negative electrode is prepared by drying after coating a mixture including a negative electrode active material, a conductive material, a binder, or the like over a negative electrode collector. In this case, as desired, the negative electrode does not include the conductive material.

The electrode active material of the electrode is a material may cause electrochemical reaction and, according to electrode types, there are a positive electrode active material and a negative electrode active material.

The positive electrode active material as a lithium transition metal oxide includes two or more transition metals and, for example, may be a layered compound such as a lithium cobalt oxide ($LiCoO_2$), lithium nickel oxide ($LiNiO_2$) and the like substituted with one or more transition metals; lithium manganese oxide substituted with one or more transition metals; lithium nickel-based oxide represented by formula, $LiNi_{1-y}M_yO_2$ (where M includes at least one of Co, Mn, Al, Cu, Fe, Mg, B, Cr, Zn and Ga, and $0.01 \leq y \leq 0.7$); a lithium nickel cobalt manganese complex oxide represented by $Li_{1+z}Ni_bMn_cCo_{1-(b+e+d)}M_dO_{(2-e)}A_e$ (where $-0.5 \leq z \leq 0.5$, $0.1 \leq b \leq 0.8$, $0.1 \leq c \leq 0.8$, $0 \leq d \leq 0.2$, $0 \leq e \leq 0.2$ and $b+c+d<1$, M is Al, Mg, Cr, Ti, Si or Y, and A is F, P or Cl) such as $Li_{1+z}Ni_{1/3}Co_{1/3}Mn_{1/3}O_2$, $Li_{1+z}Ni_{0.4}Mn_{0.4}Co_{0.2}O_2$ and the like; an olivine-based lithium metal phosphate by represented by formula $Li_{1+x}M_{1-y}M'_yPO_{4-z}X_z$ (where M is a transition metal, particularly Fe, Mn, Co or Ni, M' is Al, Mg or Ti, X is F, S or N, $-0.5 \leq x \leq +0.5$, $0 \leq y \leq 0.5$, and $0 \leq z \leq 0.1$); and the like, but the present invention is not limited thereto.

The negative electrode active material according to the present invention may be, for example, carbon and graphite materials such as natural graphite, artificial graphite, expandable graphite, carbon fiber, hard carbon, carbon black, carbon nanotubes, fullerene, and activated carbon; metals alloyable with lithium such as Al, Si, Sn, Ag, Bi, Mg, Zn, In, Ge, Pb, Pd, Pt, Ti, and the like and compounds including these elements; complexes of metals and compounds thereof and complexes of carbon and graphite materials; and lithium-containing nitrides. Among these, a carbon-based active material, a silicon-based active material, a tin-based active material, or a silicon-carbon-based active material are more preferable and may be used alone or in a combination of two or more thereamong.

The conductive material as an ingredient to improve conductivity of an electrode active material may be added in an amount of 0.01 to 30 wt % based on the total weight of an electrode mix. There is no particular limit as to the conductive material, so long as it does not cause chemical changes in the fabricated secondary battery and has conductivity. Examples of conductive materials include graphite such as natural graphite and synthetic graphite; carbon black such as carbon black, acetylene black, Ketjen black, channel black, furnace black, lamp black, and thermal black; carbon derivatives such as carbon nanotubes and fullerenes; conductive fibers such as carbon fiber and metallic fibers; metallic powders such as carbon fluoride powder, aluminum powder, and nickel powder; conductive whiskers such as zinc oxide and potassium titanate; conductive metal oxides such as titanium oxide; and polyphenylene derivatives.

A collector in the electrode is a portion in which electrons move through electrochemical reaction of an active material. In accordance with electrode type, an electrode collector is classified into a positive electrode collector and a negative electrode collector.

The positive electrode collector is typically fabricated to a thickness of 3 to 500 μm. The positive electrode collector is not particularly limited so long as it does not cause chemical changes in the fabricated secondary battery and has high conductivity. For example, the positive electrode collector may be made of stainless steel, aluminum, nickel, titanium, sintered carbon, aluminum or stainless steel surface-treated with carbon, nickel, titanium, or silver, or the like.

The negative electrode collector is typically fabricated to a thickness of 3 micrometers to 500 μm. The negative electrode collector is not particularly limited so long as it does not cause chemical changes in the fabricated secondary battery and has conductivity. For example, the positive electrode collector may be made of copper, stainless steel, aluminum, nickel, titanium, sintered carbon, copper or stainless steel surface-treated with carbon, nickel, titanium, or silver, aluminum-cadmium alloys, or the like.

A mixture (mix for electrode) of an electrode active material, conductive material, a binder, and the like may further include at least one material selected from the group consisting of a viscosity control agent and a filler.

The viscosity control agent is an ingredient controlling viscosity of an electrode mix to easily mix an electrode mix and spread the electrode mix on a collector, and a maximum amount of the viscosity control agent may be 30 wt % based on a total weight of the electrode mix. The viscosity control agent may be, for example, carboxymethyl cellulose, polyacrylic acid, or the like, but the present invention is not limited thereto.

The filler is used as a component to inhibit positive electrode expansion and is optionally used. The filler is not particularly limited so long as it is a fibrous material that does not cause chemical changes in the fabricated secondary battery. Examples of the filler include olefin-based polymers such as polyethylene and polypropylene; and fibrous materials such as glass fiber and carbon fiber.

The present invention provides a lithium secondary battery including the electrode.

Generally, the lithium secondary battery further includes a separator and a lithium salt-containing non-aqueous electrolyte in addition to an electrode.

The separator is disposed between the positive electrode and the negative electrode and an insulating thin film having high ion permeability and mechanical strength is used as the separator. The separator typically has a pore diameter of 0.01 to 10 micrometers and a thickness of 5 to 300 micrometers. As the separator, sheets or non-woven fabrics made of an olefin polymer such as polypropylene, glass fibers or polyethylene, which have chemical resistance and hydrophobicity, are used. When a solid electrolyte such as a polymer is employed as the electrolyte, the solid electrolyte may also serve as both the separator and electrolyte.

The lithium salt-containing non-aqueous electrolyte is composed of a non-aqueous electrolyte and a lithium salt.

The non-aqueous electrolyte may be, for example, an aprotic organic solvent such as N-methyl-2-pyrrolidinone, propylene carbonate, ethylene carbonate, butylene carbonate, dimethyl carbonate, diethyl carbonate, gamma-butyrolactone, 1,2-dimethoxy ethane, tetrahydrofuran, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, ethyl propionate, or the like.

The lithium salt is a material that is readily soluble in the non-aqueous electrolyte. Examples thereof include LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate, and imides.

As desired, an organic solid electrolyte, an inorganic solid electrolyte and the like may be used.

Examples of the organic solid electrolyte include polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

Examples of the inorganic solid electrolyte include nitrides, halides and sulfates of lithium (Li) such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, and $Li_3PO_4$—$Li_2S$—$SiS_2$.

In addition, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, or the like may be added to the non-aqueous electrolyte. In some cases, in order to impart incombustibility, the electrolyte may further include a halogen-containing solvent such as carbon tetrachloride and ethylene trifluoride. In addition, in order to improve high-temperature storage characteristics, the electrolyte may further include carbon dioxide gas, fluoro-ethylene carbonate (FEC), propene sultone (PRS), FEC (fluoroethylene carbonate), or the like.

The lithium secondary battery according to the present invention may be used in a battery cell used as a power source of small devices and may also be used as a unit cell in a medium or large battery module including a plurality of battery cells used as a power source of medium and large devices.

Examples of the medium and large devices include, but are not limited to, electric motor-driven power tools; electric vehicles (EVs), hybrid electric vehicles (HEVs), and plug-in hybrid electric vehicles (PHEVs); electric two-wheeled vehicles such as e-bikes and E-scooters; electric golf carts; and energy storage systems.

MODE FOR INVENTION

Now, the present invention will be described in more detail with reference to the accompanying drawings. These examples are provided for illustrative purposes only and should not be construed as limiting the scope and spirit of the present invention.

Example 1

After adding 70 g of butylacrylate, 20 g of styrene, 7 g of acrylic acid, 1 g of acrylamide, 2 g of glycidyl methacrylate, as monomers; and polyoxyethylene glycol and alkyldiphenyloxide disulfonate, as emulsifying agents to water including potassium sulfate as a polymerization initiator and mixing, polymerization was carried out at 70 t for approximately 10 hours.

Through the polymerization described above, a binder for secondary battery electrodes, the binder including polymer particles, in which monomers are polymerized, having an average particle diameter of 0.3 micrometers. The average particle diameter of the polymers may be controlled by controlling the amount of the emulsifying agent. The average particle diameter of the polymers decreases when the amounts of the two emulsifying agent increase and increases when the amounts of the two emulsifying agent increase.

Example 2

The amount of an emulsifying agent was reduced and a binder for secondary battery electrodes including polymer particles having an average particle diameter of 0.4 micrometers was prepared in the same manner as in Example 1.

Example 3

The amount of an emulsifying agent was reduced and a binder for secondary battery electrodes including polymer particles having an average particle diameter of 0.5 micrometers was prepared in the same manner as in Example 1.

Example 4

The amount of an emulsifying agent was reduced and a binder for secondary battery electrodes including polymer particles having an average particle diameter of 0.6 micrometers was prepared in the same manner as in Example 1.

Example 5

A binder for secondary battery electrodes including polymer particles having an average particle diameter of 0.3 micrometers was prepared in the same manner as in Example 1, except that acrylonitrile instead of styrene was used as monomers.

Example 6

A binder for secondary battery electrodes including polymer particles having an average particle diameter of 0.3 micrometers was prepared in the same manner as in Example 1, except that N-methylol acrylamide instead of acrylamide was used as a monomer.

Comparative Example 1

The amount of an emulsifying agent was increased and a binder for secondary battery electrodes including polymer particles having an average particle diameter of 0.2 micrometers was prepared in the same manner as in Example 1.

Comparative Example 2

The amount of an emulsifying agent was reduced and a binder for secondary battery electrodes including polymer particles having an average particle diameter of 0.8 micrometers was prepared in the same manner as in Example 1.

Comparative Example 3

A binder for secondary battery electrodes including polymer particles having an average particle diameter of 0.3 micrometers was prepared in the same manner as in Example 1, except that acrylamide was not added.

Comparative Example 4

A binder for secondary battery electrodes including polymer particles having an average particle diameter of 0.3 micrometers was prepared in the same manner as in Example 1, except that glycidyl methacrylate was not added.

Comparative Example 5

A binder for secondary battery electrodes including polymer particles having an average particle diameter of 0.3 micrometers was prepared in the same manner as in Example 1, except that the amount of acrylamide was increased to 6 g.

Comparative Example 6

A binder for secondary battery electrodes including polymer particles having an average particle diameter of 0.3 micrometers was prepared in the same manner as in Example 1, except that the amount of glycidyl methacrylate was increased to 6 g.

Experimental Example

Adhesive Strength Test

First, each of the binders prepared according to Examples 1 to 6 and Comparative Examples 1 to 6 was added to prepare a slurry including a negative electrode active material, conductive material, a thickener, and a binder in a ratio of 95:1:1:3. Subsequently, the slurry was coated over Cu foil to prepare electrodes and dried at 90° C. and 120° C.

Each of the prepared electrodes was pressed to a constant thickness and cut to a constant interval, to fix to a slide. Subsequently, 180 degree peel strength was measured while peeling a collector. Results are summarized in Table 1 below. For evaluation, peel strength of five collectors or more was measured and an average value thereof was determined.

TABLE 1

| | Adhesive strength (gf/cm) | |
|---|---|---|
| | Dry at 90□ | Dry at 120□ |
| Example 1 | 40 | 34 |
| Example 2 | 42 | 38 |
| Example 3 | 39 | 36 |
| Example 4 | 38 | 37 |
| Example 5 | 38 | 32 |
| Example 6 | 43 | 33 |
| Comparative Example 1 | 29 | 21 |
| Comparative Example 2 | 25 | 24 |
| Comparative Example 3 | 27 | 23 |
| Comparative Example 4 | 30 | 25 |
| Comparative Example 5 | 15 | 11 |
| Comparative Example 6 | 13 | 6 |

As shown in Table 1, it can be confirmed that the electrodes including the binders according to Examples 1 to 5 of the present invention exhibit excellent adhesive strength, when compared with the electrode according to Comparative Examples 1 and 6. In particular, it can be confirmed that, adhesive strength dramatically increases when an average particle diameter is greater than 0.3 micrometers, through comparison of Comparative Example 1 and Example 1. In addition, it can be confirmed that adhesive strength change according to particle diameters is greater at 120° C. than 90° C. This phenomenon is caused by dramatically reduced migration of a binder in a dying process and increase of the migration effects with increasing temperature in an average particle diameter of larger than 0.3 micrometers than an average particle diameter of less than 0.3 micrometers. It is considered that this phenomenon is caused by adhesive strength reduction effects due to migration of the binder relatively larger than adhesive strength improvement due to a specific surface area of the binder.

On the other hand, Comparative Example 2 exhibits low adhesive strength despite a large average particle diameter. In the case of the binder having an average particle diameter of 0.8 micrometers, migration of the binder is reduced but a specific surface area of the binder is dramatically reduced. Accordingly, a contact area to an active material decreases and, as such, reduction effects of adhesive strength are extremely great.

It can be confirmed that adhesive strength of Comparative Example 3 not including acrylamide monomers and Comparative Example 4 not including glycidyl methacrylate monomers decreases, when compared with Example 1. Comparative Example 5 including a large amount of acrylamide monomers and Comparative Example 6 including a large amount of glycidyl methacrylate monomers exhibit decreased adhesive strength as in Comparative Examples 3 and Comparative Example 4, when compared with Example 1.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As described above, since a binder for secondary battery electrodes according to the present invention includes monomers of (A) to (E), described above, and polymer particles having an average particle diameter of 0.3 micrometers to 0.7 micrometers, adhesive strength to an electrode collector and bearing strength of an active material are superior even after high-temperature drying and, as such, cycle characteristics of a battery may be improved.

The invention claimed is:

1. A binder for secondary battery electrodes, the binder comprising polymer particles being prepared only from monomers consisting of:
   (A) (meth)acrylic acid ester based monomers of 15 to 96 wt %;
   (B) at least one monomer selected from the group consisting of an acrylate based compound, a styrene based compound, and a compound having a cyano group of 1 to 55 wt %, wherein the acrylate based compound does not include an epoxy group;
   (C) unsaturated carboxylic acid based monomers of 1 to 20 wt %;
   (D) (meth)acrylamide based monomers of 1 to 5 wt %; and
   (E) a (meth)acrylate comprising at least one epoxy group for crosslinking of 1 to 5 wt %, with respect to a total weight of the binder,
   wherein the (meth)acrylate comprising at least one epoxy group for crosslinking is glycidyl (meth)acrylate, and
   wherein an average particle diameter of the polymer particles is controlled to have 0.3 micrometers to 0.6 micrometers by utilizing an emulsifying agent comprising polyoxyethylene glycol and alkyldiphenyloxide disulfonate having a C1-C20 alkyl group.

2. The binder according to claim 1, wherein the (meth) acrylic acid ester based monomers are at least one monomer selected from the group consisting of methylacrylate, ethylacrylate, propylacrylate, isopropylacrylate, n-butylacrylate, isobutylacrylate, n-amylacrylate, isoamylacrylate, n-ethylhexylacrylate, 2-ethylhexylacrylate, 2-hydroxyethylacrylate, methylmethacrylate, ethylmethacrylate, propylmethacrylate, isopropylmethacrylate, n-butylmethacrylate, isobutylmethacrylate, n-amylmethacrylate, isoamylmethacrylate, n-hexylmethacrylate, n-ethylhexyl methacrylate, 2-ethylhexyl methacrylate, hydroxyethyl methacrylate, and hydroxypropyl methacrylate.

3. The binder according to claim 1, wherein the acrylate based compound is at least one compound selected from the group consisting of methacryloxy ethyl ethylene urea, beta-carboxy ethylacrylate, aliphatic monoacrylate, dipropylene diacrylate, ditrimethylolpropane tetraacrylate, hydroxyethyl acrylate, dipentaerythritol hexaacrylate, pentaerythritol triacrylate, pentaerythritol tetraacrylate, lauryl acrylate, ceryl acrylate, stearyl acrylate, lauryl methacrylate, cetyl methacrylate, and stearyl methacrylate.

4. The binder according to claim 1, wherein the styrene based compound is at least one compound selected from the group consisting of styrene, alpha-methylstyrene, beta-methylstyrene, p-t-butylstyrene, and divinylbenzene.

5. The binder according to claim 1, wherein the compound comprising the cyano group is an alkenyl cyanide and the alkenyl cyanide is at least one selected from the group consisting of acrylonitrile, methacrylonitrile, and allyl cyanide.

6. The binder according to claim 1, wherein the unsaturated carboxylic acid based monomers are at least one monomer selected from the group consisting of maleic acid, fumaric acid, methacrylic acid, acrylic acid, glutaconic acid, itaconic acid, tetrahydrophthalic acid, crotonic acid, isocrotonic acid and nadic acid.

7. The binder according to claim 1, wherein the (meth) acrylamide based monomers are at least one selected from the group consisting of acrylamide, methacrylamide, N-methylacrylamide, N-methylmethacrylamide, N,N-dimethylacrylamide, N,N-dimethylmethacrylamide, N-ethylacrylamide, N-ethylmethacrylamide, N-n-propylacrylamide, N-n-propylmethacrylamide, N-isopropylacrylamide, N-isopropylmethacrylamide and N-n-butylacrylamide, N-methylol(meth)acrylamide, N-butoxymethyl(meth)acrylamide, N-[4-(3-(4-dodecyl-phenylcarbamoyl)-propyl)phenyl]acrylamide (NDPA), (N-[5-(4-dodecyl-phenylcarbamoyl)-phenyl]acrylamide (DPPA)N-[3-{(4-dodecyl-phenylcarbamoyl)-methylene-carbamoyl}propyl-4-phenyl] acrylamide (DMCPA), and N-[3-{(4-dodecyl-phenylcarbamoyl)-pentamethylene-carbamoyl}propyl-4-phenyl]acrylamide (DPMCPA).

8. The binder according to claim 1, wherein the binder further comprises at least one material selected from the group consisting of a viscosity control agent and a filler.

9. An electrode mix for secondary batteries, the electrode mix comprising the binder for secondary battery electrodes according to claim 1 and an electrode active material for occlusion and release of lithium.

10. The electrode mix according to claim 9, wherein the electrode active material is lithium transition metal oxide powder or carbon powder.

11. An electrode for secondary battery electrodes comprising the electrode mix according to claim 10 coated over an electrode collector.

12. A lithium secondary battery comprising the electrode for secondary batteries according to claim 11.

13. A binder according to claim 1, the binder comprising polymer particles being prepared only from monomers consisting of:
   (A) butyl (meth)acrylate of 15 to 96 wt %;
   (B) at least one monomer selected from a styrene and an acrylonitrile of 1 to 55 wt %;
   (C) (meth)acrylic acid of 1 to 20 wt %;
   (D) (meth)acrylamide of 1 to 5 wt %; and
   (E) glycidyl methacrylate of 1 to 5 wt %, with respect to a total weight of the binder,
   wherein an average particle diameter of the polymer particles is controlled to have 0.3 micrometers to 0.6 micrometers by utilizing an emulsifying agent comprising polyoxyethylene glycol and alkyldiphenyloxide disulfonate having a C1-C20 alkyl group.

* * * * *